United States Patent
Tanaka

(10) Patent No.: US 8,848,279 B2
(45) Date of Patent: Sep. 30, 2014

(54) ELECTROPHORETIC DISPLAY DEVICE

(71) Applicant: Samsung Display Co., Ltd., Yongin (KR)

(72) Inventor: Sakae Tanaka, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/733,818

(22) Filed: Jan. 3, 2013

(65) Prior Publication Data

US 2013/0250399 A1 Sep. 26, 2013

(30) Foreign Application Priority Data

Mar. 20, 2012 (KR) ........................ 10-2012-0028377

(51) Int. Cl.
*G02B 26/00* (2006.01)
*G02F 1/167* (2006.01)

(52) U.S. Cl.
CPC ........ *G02F 1/167* (2013.01); *G02F 2001/1672* (2013.01); *G02F 2001/1676* (2013.01)
USPC ......................................................... 359/296

(58) Field of Classification Search
USPC ............................ 359/290–297; 345/107, 690
See application file for complete search history.

(56) References Cited

U.S. PATENT DOCUMENTS

| | | | |
|---|---|---|---|
| 7,692,845 B2 | 4/2010 | Seo et al. | |
| 7,782,292 B2 | 8/2010 | Miyasaka et al. | |
| 8,054,288 B2 * | 11/2011 | Sugita et al. | 345/107 |
| 2003/0103258 A1 * | 6/2003 | Kawai | 359/296 |
| 2010/0085628 A1 * | 4/2010 | Lee | 359/296 |
| 2011/0026099 A1 * | 2/2011 | Kwon et al. | 359/296 |
| 2011/0157681 A1 | 6/2011 | Kwon et al. | |
| 2012/0223929 A1 * | 9/2012 | Sato | 345/211 |

FOREIGN PATENT DOCUMENTS

| | | |
|---|---|---|
| JP | 09-211499 | 8/1997 |
| JP | 2002-214650 | 7/2002 |
| JP | 2003-161966 | 6/2003 |
| JP | 2004-177950 | 6/2004 |
| JP | 2005-107311 | 4/2005 |
| JP | 2005-351993 | 12/2005 |
| JP | 2006-162901 | 6/2006 |
| JP | 2006-201303 | 8/2006 |
| JP | 2007-065306 | 3/2007 |
| JP | 2007-121785 | 5/2007 |
| JP | 2009-031640 | 2/2009 |
| KR | 1020050110392 | 11/2005 |
| KR | 1020070000913 | 1/2007 |
| KR | 1020070008068 | 1/2007 |
| KR | 1020090061470 | 6/2009 |
| KR | 1020110071668 | 6/2011 |

* cited by examiner

*Primary Examiner* — Mahidere Sahle
(74) *Attorney, Agent, or Firm* — Innovation Counsel LLP

(57) ABSTRACT

An electrophoretic display device includes a first substrate, a second substrate facing the first substrate, and a barrier electrode disposed between the first and second substrates to define a pixel. An electrophoretic material is placed in the pixel. The pixel includes a first pixel electrode and a second pixel electrode disposed on and insulated from the first pixel electrode. The electrophoretic material moves according to an electric field generated between the barrier electrode and the first pixel electrode and between the barrier electrode and the second pixel electrode, so that a plurality of gray scales is displayed through the pixel.

20 Claims, 20 Drawing Sheets

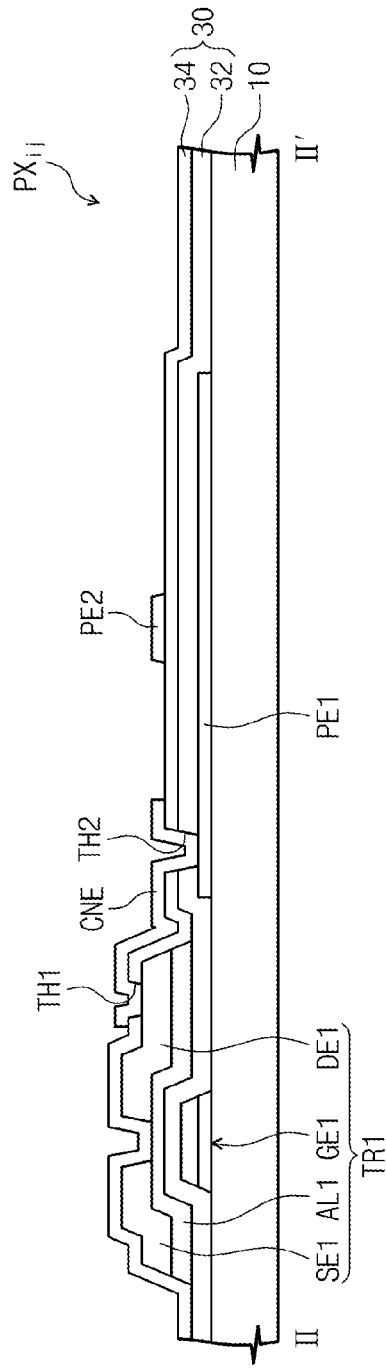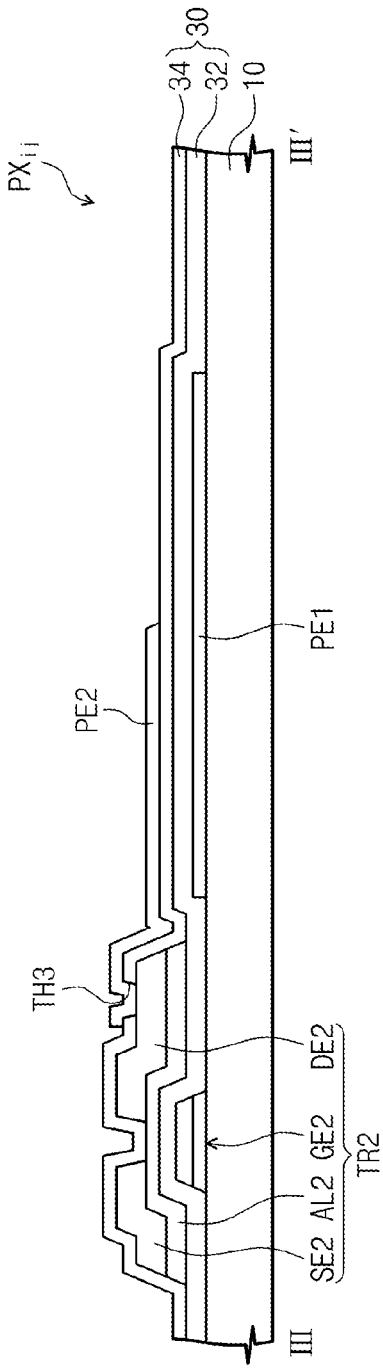

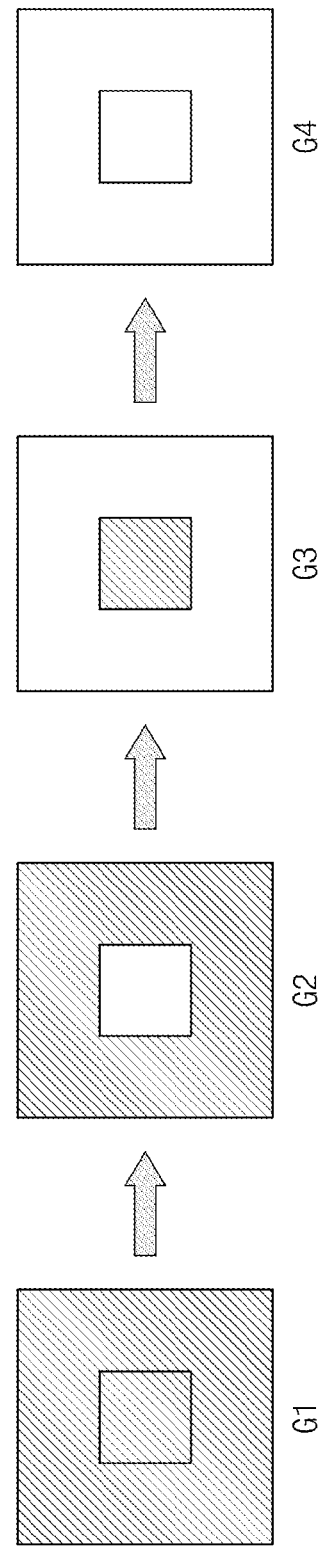

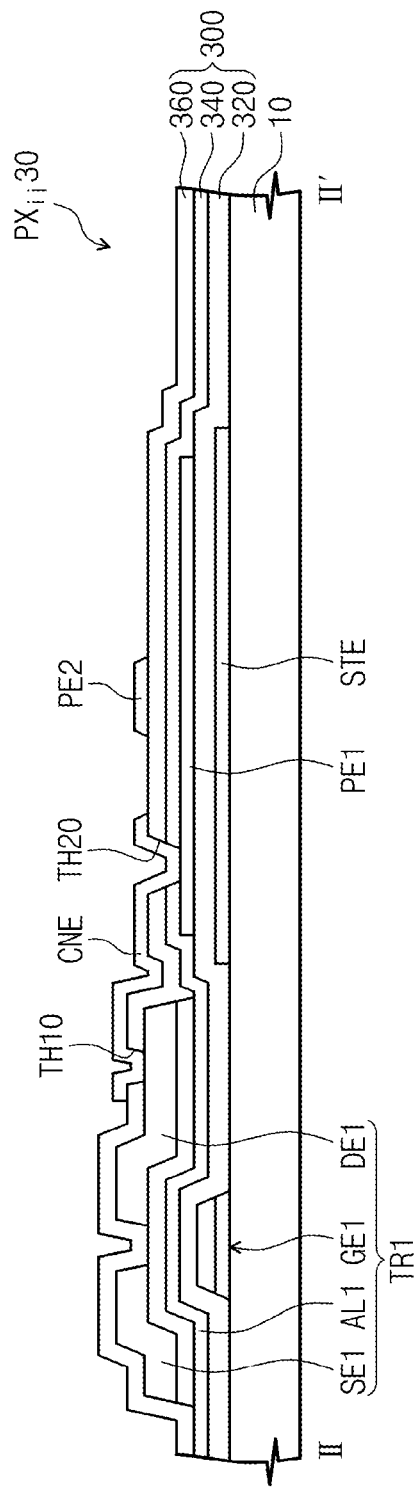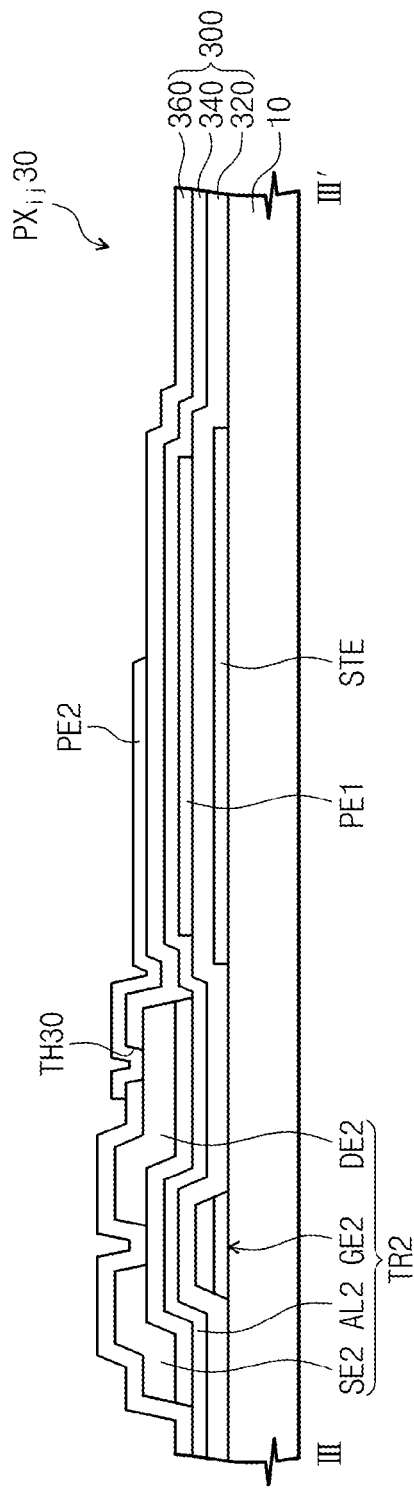

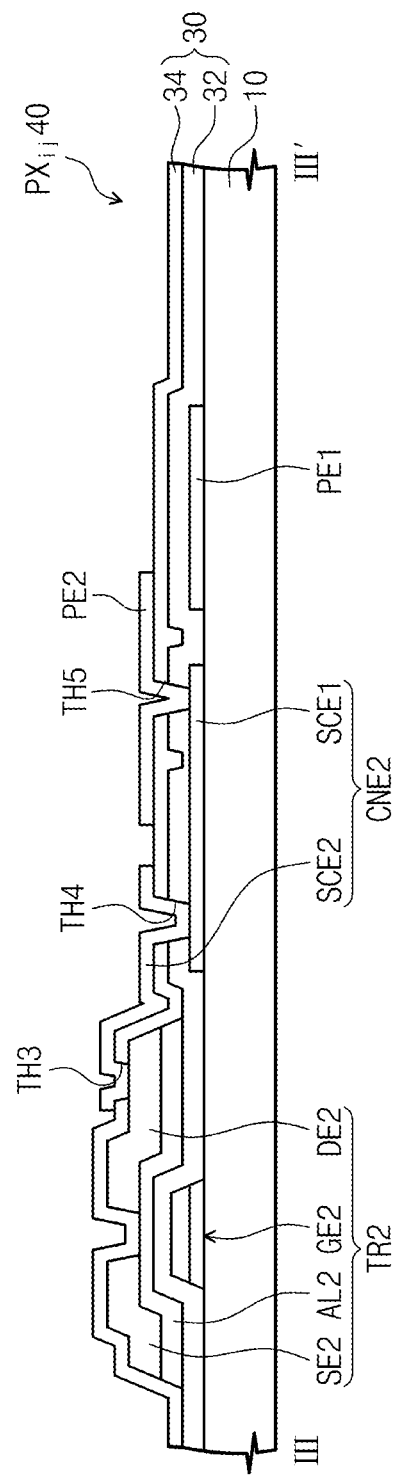

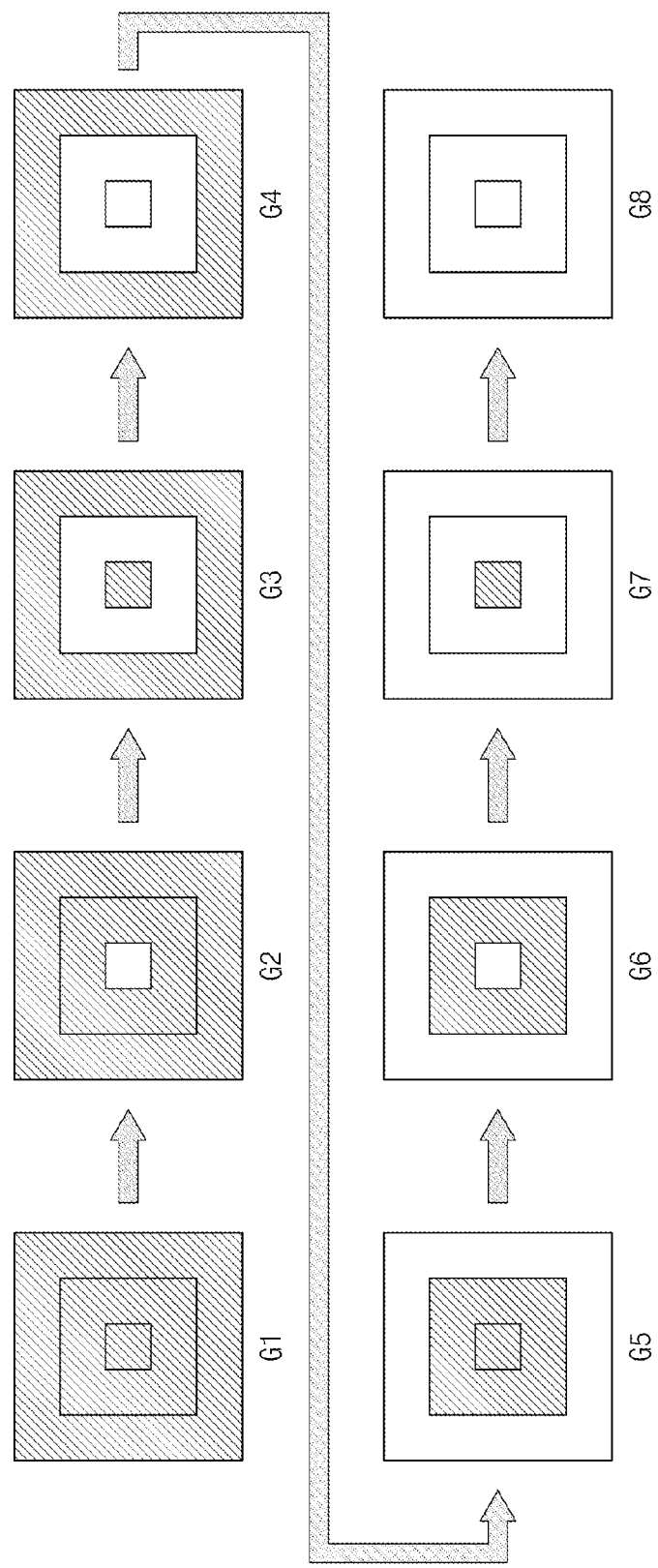

ELECTROPHORETIC DISPLAY DEVICE

CROSS-REFERENCE TO RELATED APPLICATION

This U.S. non-provisional patent application claims priority under 35 U.S.C. §119 of Korean Patent Application No. 10-2012-0028377 filed on Mar. 20, 2012, the contents of which are hereby incorporated by reference.

BACKGROUND

1. Field of Disclosure

The present disclosure relates to an electrophoretic display device. More particularly, the present disclosure relates to an electrophoretic display device having improved display quality.

2. Description of the Related Art

An electrophoretic display device includes electrophoretic particles disposed to correspond to pixels. The electrophoretic particles are charged to have a positive polarity or a negative polarity. The electrophoretic display device utilizes an electrophoretic phenomenon in which the particles move according to an electric field formed in the pixels.

The pixels absorb or reflect light from the outside to display an image. That is, the electrophoretic particles are placed at two different positions in accordance with the direction of the electric field, and thus the pixels absorb or reflect incident light.

When the pixels absorb incident light, the image is displayed in black color, and the image is displayed in white color when the pixels reflect incident light.

An electric field is generated between a pixel electrode and a barrier electrode. The intensity of an electric field depends on the area of the pixel electrode, and the electrophoretic particles are distributed in different densities in each area of the pixel electrode according to the intensity of the electric field. Thus, it is difficult to display low gray scales with the pixels.

In addition, since the electrophoretic particles are placed at two different positions in accordance with the direction of the electric field, only a limited number of gray scales may be displayed by the pixels.

SUMMARY

The present disclosure provides an electrophoretic display device capable of improving a contrast ratio and displaying plural gray scales.

Embodiments of the inventive concept provide an electrophoretic display device includes a first substrate, a second substrate that faces the first substrate, and a barrier electrode disposed between the first substrate and the second substrate. The barrier electrode defines a pixel and receives a common voltage. An electrophoretic material is placed in the pixel, and the electrophoretic material includes a dielectric solvent and a plurality of electrophoretic particles distributed in the dielectric solvent.

The pixel includes a first pixel electrode, a first thin film transistor that applies a first pixel voltage to the first pixel electrode, a second pixel electrode disposed on the first pixel electrode and insulated from the first pixel electrode, and a second thin film transistor that applies a second pixel voltage to the second pixel electrode.

Positions of the electrophoretic particles are controlled by an electric field generated between the barrier electrode and the first pixel electrode and between the barrier electrode and the second pixel electrode, and the pixel displays a plurality of gray scales corresponding to the positions of the electrophoretic particles.

According to an embodiment, the electrophoretic display device includes a first pixel electrode provided with a plurality of slits formed by partially removing the first pixel electrode.

According to an embodiment, the electrophoretic display device further includes a repelling electrode disposed on the second substrate to push out the electrophoretic particles from the second substrate.

According to an embodiment, the pixel further includes a storage electrode disposed at a lower portion of the first pixel electrode and insulated from the first pixel electrode while overlapping with the first pixel electrode.

According to an embodiment, the pixel further includes a third pixel electrode disposed to be spaced apart from the first pixel electrode w and a third thin film transistor that applies a third pixel voltage to the third pixel electrode.

According to the above, the electrophoretic display device applies different pixel voltages to the pixel electrodes so as to easily display low gray scales. Thus, the contrast ratio of the electrophoretic display device may be improved.

BRIEF DESCRIPTION OF THE DRAWINGS

The above and other advantages of the present invention will become readily apparent by reference to the following detailed description when considered in conjunction with the accompanying drawings wherein:

FIG. 3B is a cross-sectional view taken along a line II-II' shown in FIG. 3A;

FIG. 3C is a cross-sectional view taken along a line III-III' shown in FIG. 3A;

FIG. 5 is a view showing gray scales in accordance with positions of electrophoretic particles;

FIGS. 9A and 9B are cross-sectional views showing a pixel according to another exemplary embodiment of the present invention;

FIG. 10C is a cross-sectional view taken along a line V-V' shown in FIG. 10A;

FIG. 13 is a view showing gray scales displayed in the pixel shown in FIG. 11.

DETAILED DESCRIPTION

Figure 1:
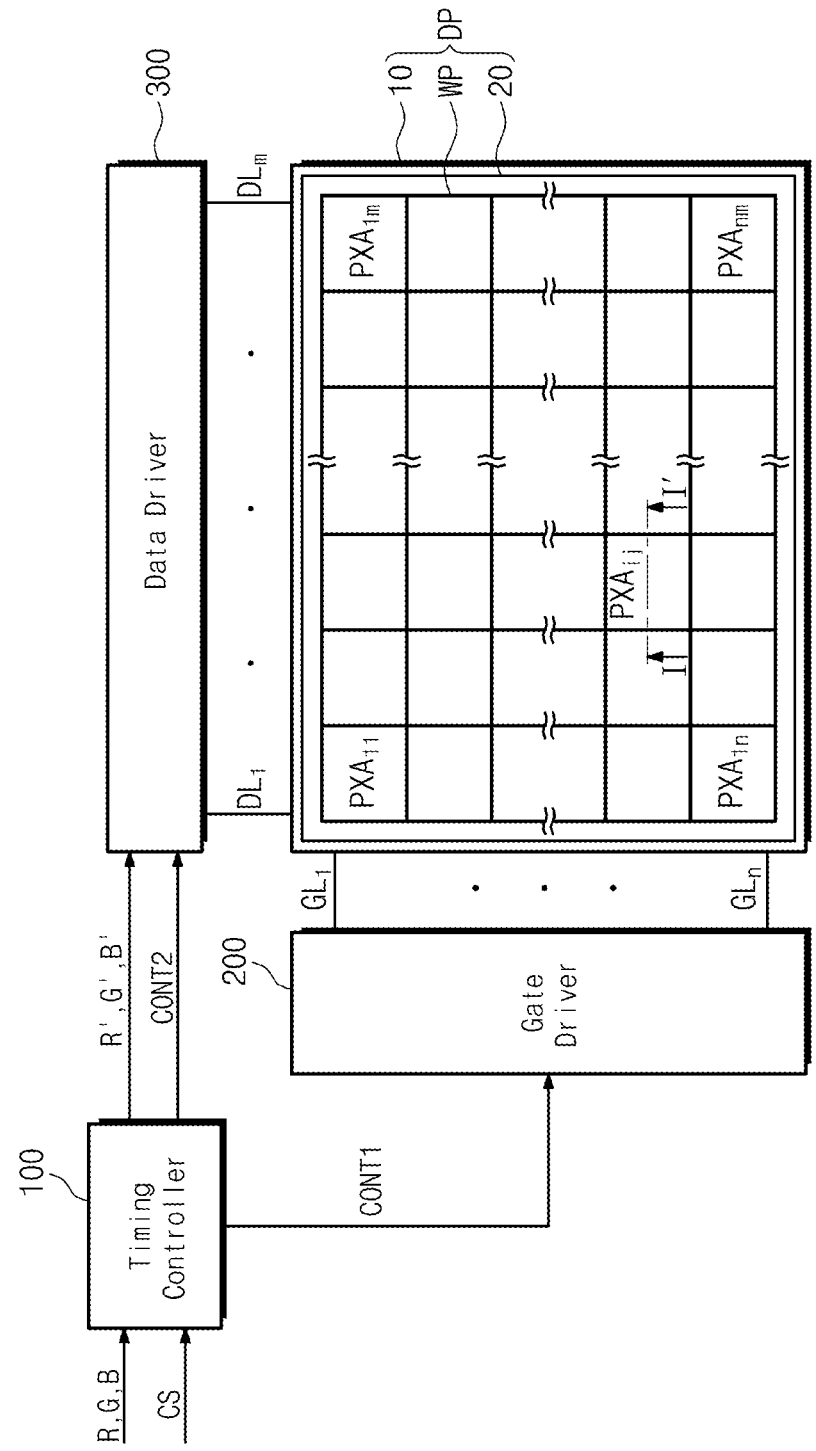
FIG. 1 is a block diagram showing an electrophoretic display device according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2A:
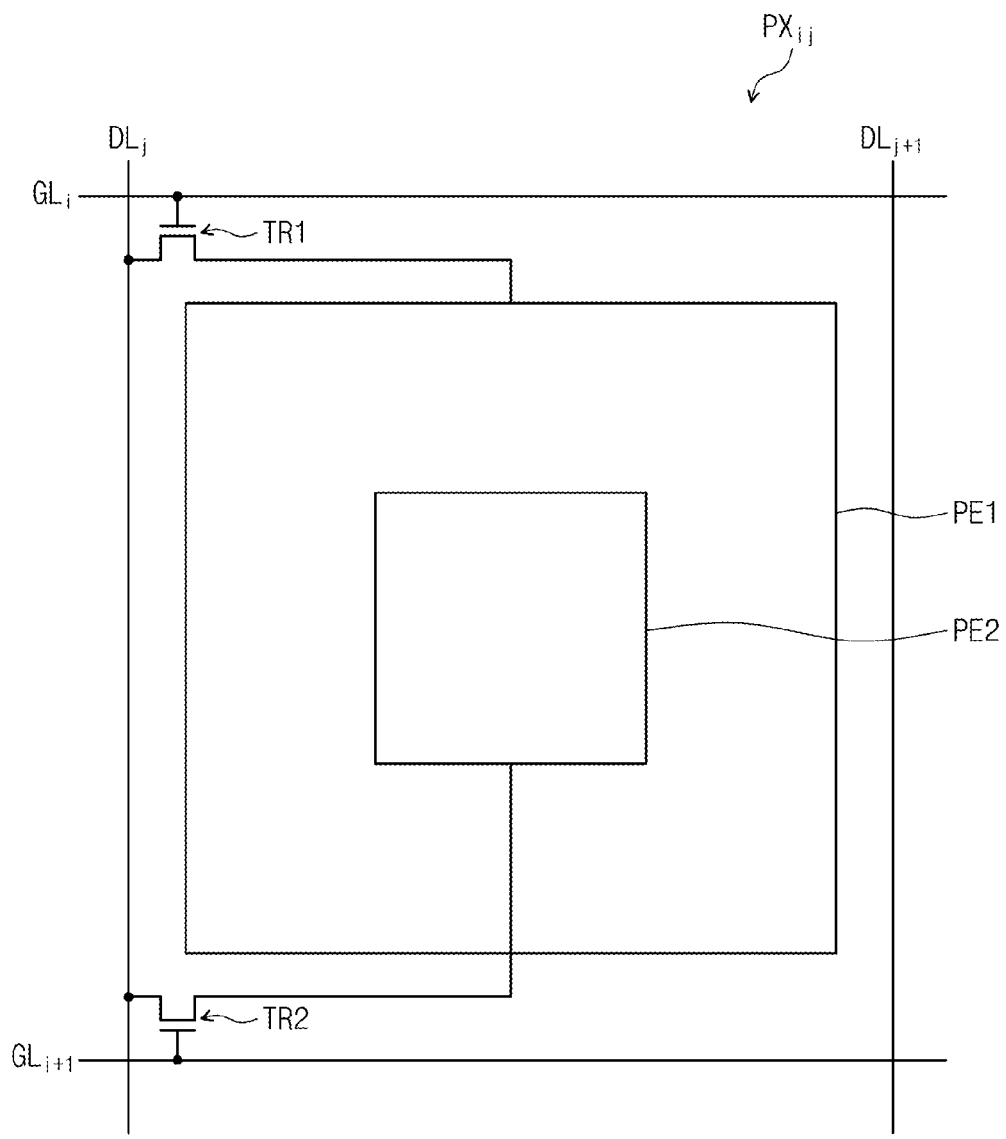
FIG. 2A is a view showing a pixel shown in FIG. 1.
Figure 2B:
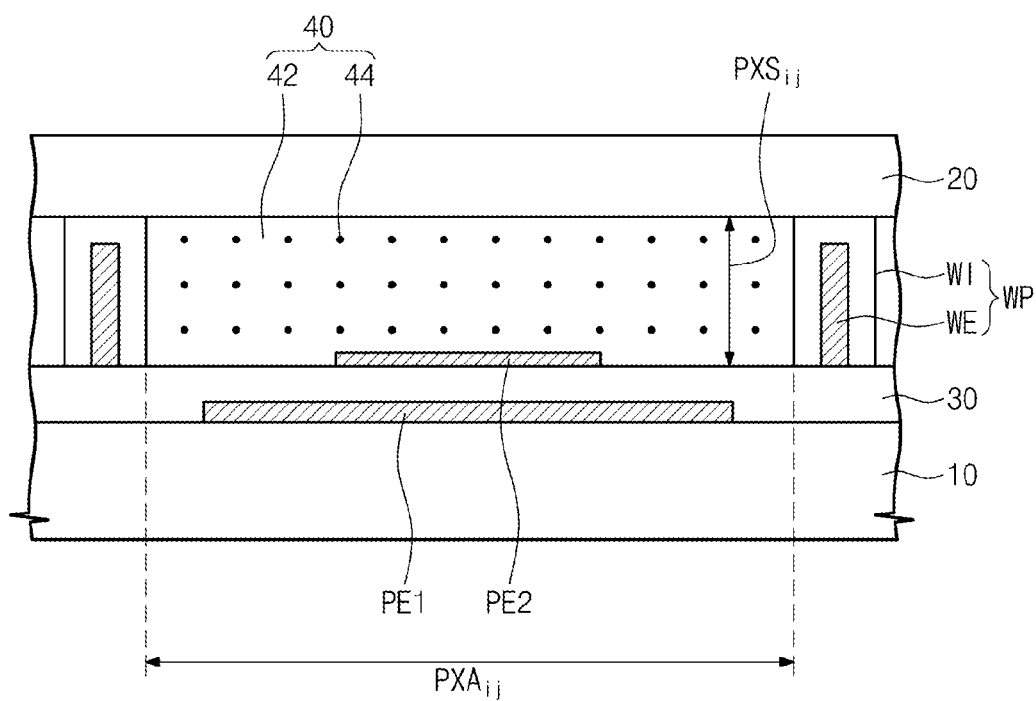
FIG. 2B is a cross-sectional view taken along a line I-I' shown in FIG. 1.

FIG. 1 is a block diagram showing an electrophoretic display device according to an exemplary embodiment of the present invention. FIG. 2A is a view showing a pixel shown in FIG. 1 and FIG. 2B is a cross-sectional view taken along a line I-I' shown in FIG. 1.

Referring to FIG. 1, an electrophoretic display device includes a timing controller 100, a gate driver 200, a data driver 300, and a display panel DP.

The timing controller 100 receives image signals R, G, and B and converts the image signals R, G, and B into image data R', G', and B' appropriate to the operating condition of the display panel DP. In addition, the timing controller 100 receives various control signals CS, such as a vertical synchronization signal, a horizontal synchronization signal, a main clock, a data enable signal, etc., and outputs a first control signal CONT1 and a second control signal CONT2.

The gate driver 200 outputs gate signals to gate lines GL1 to GLn in response to the first control signal CONT1. The first control signal CONT1 includes a vertical start signal that starts the operation of the gate driver 200, a gate clock signal that determines an output timing of a gate voltage, and an output enable signal that determines an ON pulse width of the gate voltage.

The data driver 300 receives the second control signal CONT2 and the image data R', G', and B'. The second control signal CONT2 includes a horizontal start signal that starts the operation of the data driver 300, an inversion signal that inverts a polarity of the data voltage, and an output timing signal that determines an output timing of the data voltage from the data driver 300. The data driver 300 converts the image data R', G', and B' to the data voltages and outputs the data voltages.

The display panel DP includes a first substrate 10, a second substrate 20 facing the first substrate 10, and a barrier wall WP disposed between the first substrate 10 and the second substrate 20. The barrier wall WP defines a plurality of pixel spaces PXA11 to PXAnm in plan view.

The first substrate 10 includes a plurality of pixels disposed to correspond to the pixel spaces PXA11 to PXAnm, respectively. In addition, the gate lines GL1 to GLn and data lines DL1 to DLm crossing the gate lines GL1 to GLn are disposed on the first substrate 10.

The pixel spaces PXA11 to PXAnm shown in FIG. 1 have the same configuration and function, and thus, for the convenience of explanation, a pixel PXij corresponding to one pixel space PXAij (refer to FIG. 1) has been shown in FIGS. 2A and 2B.

Referring to FIG. 2A, the pixel PXij includes a first thin film transistor TR1, a first pixel electrode PE1, a second thin film transistor TR2, and a second pixel electrode PE2.

The first thin film transistor TR1 is connected to an i-th gate line GLi of the gate lines GL1 to GLn, a j-th data line DLj of the data lines DL1 to DLm, and the first pixel electrode PE1. The thin film transistor TR1 outputs the data voltage applied to the j-th data line DLj to the first pixel electrode PE1 in response to the gate signal applied to the i-th gate line GLi. Hereinafter, the data voltage applied to the first pixel electrode PE1 will be referred to as a first pixel voltage.

The second pixel electrode PE2 is disposed on and insulated from the first pixel electrode PE1.

The second thin film transistor TR2 is connected to an (i+1)th gate line GLi+1 of the gate lines GL1 to GLn, the j-th data line DLj, and the second pixel electrode PE2. The second thin film transistor TR2 outputs the data voltage applied to the j-th data line DLj to the second pixel electrode PE2 in response to the gate signal applied to the (i+1)th gate line GLi+1. Hereinafter, the data voltage applied to the second pixel electrode PE2 will be referred to as a second pixel voltage.

In plan view, the i-th gate line GLi and the (i+)th gate line GLi+1 are disposed at upper and lower portions of the first pixel electrode PE1, respectively, and the j-th data line DLj and a (j+1)th data line DLj+1 are respectively disposed at left and right portions of the first pixel electrode PE1.

As shown in FIG. 2B, the first pixel electrode PE1 is disposed on the first substrate 10. An insulating layer 30 is disposed on the first substrate 10 to cover the first pixel electrode PE1. Although not shown in FIG. 2B, the insulating layer 30 may be provided in a plural number. In this case, the plural insulating layers may have different materials from each other.

The second pixel electrode PE2 is disposed on the insulating layer 30. Although not shown in figures, a protective layer may be further disposed on the insulating layer 30 to cover the second pixel electrode PE2.

An electrophoretic material is accommodated in a pixel space PXS defined by the barrier wall WP. The barrier wall WP includes a barrier electrode WE and a protective member WI that covers the barrier electrode WE. The protective member WI covers the barrier electrode WE to allow the barrier electrode WE not to be exposed to a dielectric solvent 42.

According to embodiments, the protective member WI may be omitted and the barrier electrode WE may be directly coupled to the second substrate 20. In this case, the barrier electrode WE defines the pixel space PXS.

The electrophoretic material 40 includes the dielectric solvent 42 and electrophoretic particles 44 distributed in the dielectric solvent 42. The electrophoretic particles 44 are positively or negatively charged to have a positive (+) polarity or a negative (−) polarity and have a black color. The electrophoretic particles 44 may have one of red, blue, green, and white colors. For simplicity of explanation, an embodiment where the electrophoretic particles 44 are black and positively (+) charged will be described as a representative example. It should be understood, however, that the electrophoretic material 40 may further include white electrophoretic particles that are negatively (−) charged.

Although not shown in the figures, a color filter having one of red, green, and blue colors may be disposed on the second substrate 20.

Figure 3A:
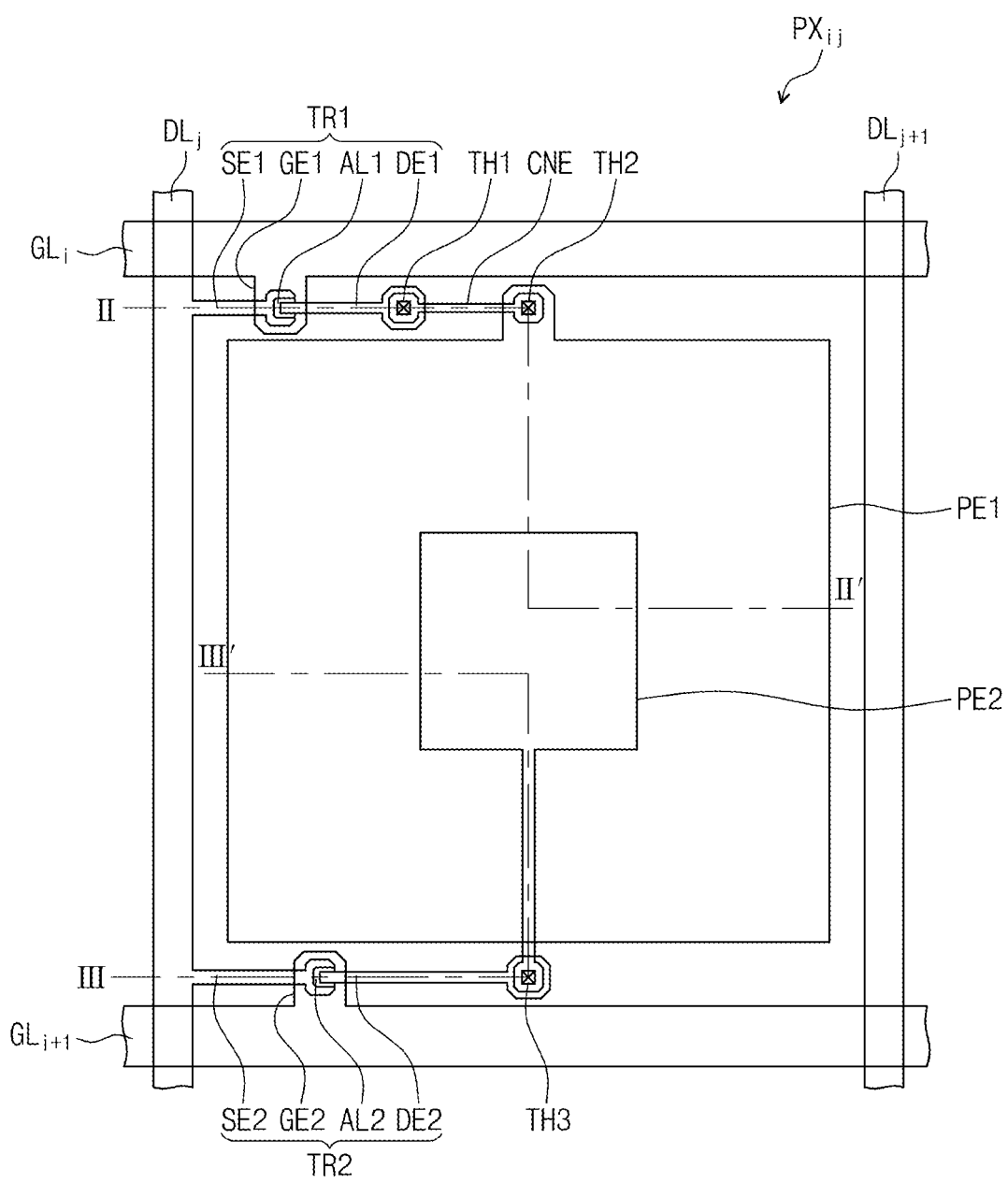
FIG. 3A is a plan view showing a pixel shown in FIG. 2A.

FIG. 3A is a plan view showing a pixel shown in FIG. 2A, FIG. 3B is a cross-sectional view taken along a line II-II' shown in FIG. 3A, and FIG. 3C is a cross-sectional view taken along a line III-III' shown in FIG. 3A. Hereinafter, the pixel PXij will be described in detail with reference to FIGS. 3A to 3C.

The first thin film transistor TR1 includes a first gate electrode GE1, a first semiconductor layer AL1, a first source electrode SE1, and a first drain electrode DE1. The second thin film transistor TR2 includes a second gate electrode GE2, a second semiconductor layer AL2, a second source electrode SE2, and a second drain electrode DE2.

The first gate electrode GE1 branched from the i-th gate line GLi, the second gate electrode GE2 branched from the (i+1)th gate line GLi+1, and the first pixel electrode PE1 are disposed on the first substrate 10. A first insulating layer 32 is disposed on the first substrate 10 to cover the first gate electrode GE1, the second gate electrode GE2, and the first pixel electrode PE1.

The first gate electrode GE1 and the second gate electrode GE2 may have a multi-layer structure of a metal layer and a metal oxide layer disposed on the metal layer. The first pixel electrode PE1 may be configured to have the same layers as the first gate electrode GE1, only the metal layer, or only the metal oxide layer.

According to embodiments, each of the first gate electrode GE1 and the second gate electrode GE2 may be configured to include a first metal layer formed of chromium (Cr), molybdenum (Mo), or an alloy thereof and a second metal layer formed of aluminum (Al), silver (Ag), or an alloy thereof.

The first semiconductor layer AL1 and the second semiconductor layer AL2 are disposed on the first insulating layer 32 to overlap the first gate electrode GE1 and the second gate electrode GE2, respectively. The first source electrode SE1 branched from the j-th data line DLj and the first drain electrode DE1 spaced apart from the first source electrode SE1 are disposed on the first semiconductor layer AL1. The second source electrode SE2 and the second drain electrode DE2 are disposed on the second semiconductor layer AL2 to be spaced apart from each other.

A second insulating layer 34 is disposed on the first insulating layer 32 to cover the first thin film transistor TR1 and the second thin film transistor TR2. The second pixel electrode PE2 is disposed on the second insulating layer 34.

Referring to FIG. 3B, a connection electrode CNE disposed on the second insulating layer 34 connects the first drain electrode DE1 and the first pixel electrode PE1. The connection electrode CNE connects the first drain electrode DE1 and the first pixel electrode PE1 through a first contact hole TH1 formed through the second insulating layer 34 and a second contact hole TH2 formed through the first insulating layer 32 and the second insulating layer 34.

Referring to FIG. 3C, the second pixel electrode PE2 is connected to the second drain electrode DE2 through a third contact hole TH3 formed through the second insulating layer 34. The second pixel electrode PE2 includes an electrode portion disposed corresponding to a center portion of the first pixel electrode PE1 and a connection portion branched from the electrode portion. The connection portion of the second pixel electrode PE2 has a width narrower than that of the electrode portion of the second pixel electrode PE2.

FIGS. 4A to 4D are cross-sectional views showing positions of electrophoretic particles according to an electric field, and FIG. 5 is a view showing gray scales in accordance with positions of electrophoretic particles.

The barrier electrode WE receives a common voltage Vcom. The common voltage Vcom has a constant level. As described above, the first pixel electrode PE1 and the second pixel electrode PE2 are applied with the first pixel voltage and the second pixel voltage, respectively.

The positions of the electrophoretic particles 44 are controlled by the electric field generated between the barrier electrode WE and the first pixel electrode PE1 and between the barrier electrode WE and the second pixel electrode PE2. The pixel PXij displays plural gray scales in accordance with the positions of the electrophoretic particles 44.

As shown in FIG. 5, the pixel PXij may display four gray scales. In other words, the images displayed through the pixel PXij have different gray scales from each other. A first gray scale G1 represents the black color, a fourth gray scale G4 represents the white color, and second and third gray scales G2 and G3 represent different gray colors from each other.

Figure 4A:
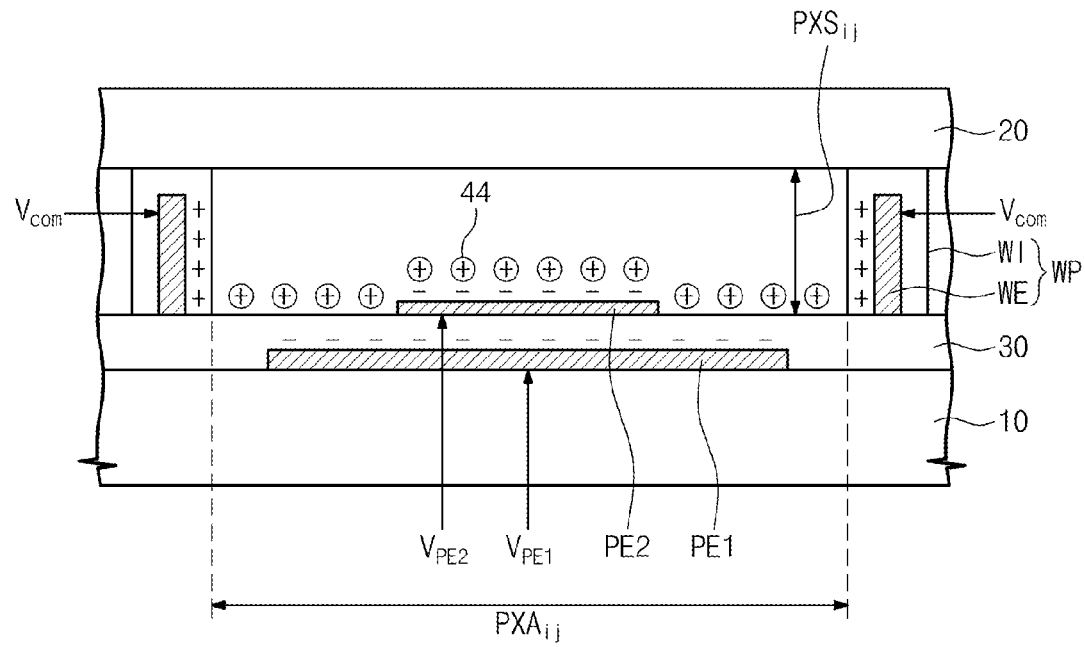
FIGS. 4A to 4D are cross-sectional views showing positions of electrophoretic particles according to an electric field.

Referring to FIG. 4A, when the first pixel voltage VPE1 and the second pixel voltage VPE2 are lower than the common voltage VCOM, the pixel PXij displays the lowest gray scale among the gray scales. That is, the pixel PXij displays the first gray scale G1.

In order to allow the first gray scale G1 to display an almost complete black color, the second pixel voltage VPE2 is made lower than the first pixel voltage VPE1. In plan view, the intensity of the electric field in the center portion of the pixel PXij is lower than the intensity of the electric field in the outer portion of the pixel PXij. When the second pixel voltage VPE2 is lower than the first pixel voltage VPE1, the intensity of the electric field in the center portion of the pixel PXij where the second pixel electrode PE2 is disposed is increased. Accordingly, a density difference between the electrophoretic particles 44 in the center portion of the pixel PXij and the electrophoretic particles 44 in the outer portion of the pixel PXij is reduced.

When the electrophoretic particles 44 have negative (−) polarity, the first pixel voltage VPE1 and the second pixel voltage VPE2 are at higher levels than the common voltage VCOM so as to display the first gray scale G1.

When the first pixel voltage VPE1 and the second pixel voltage VPE2 have different polarities from each other with reference to the common voltage VCOM, the pixel PXij displays the intermediate gray scales.

Figure 4B:
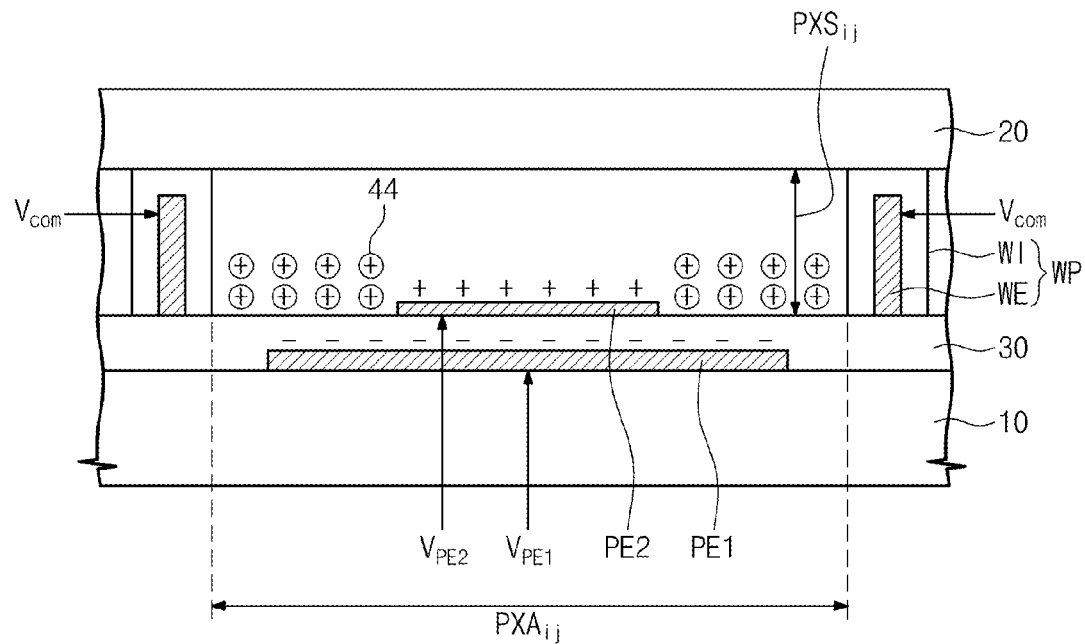

As shown in FIG. 4B, when the first pixel voltage VPE1 is lower than the common voltage VCOM and the second pixel voltage VPE2 is higher than the common voltage VCOM, the pixel PXij displays the second gray scale G2 shown in FIG. 5.

Figure 4C:
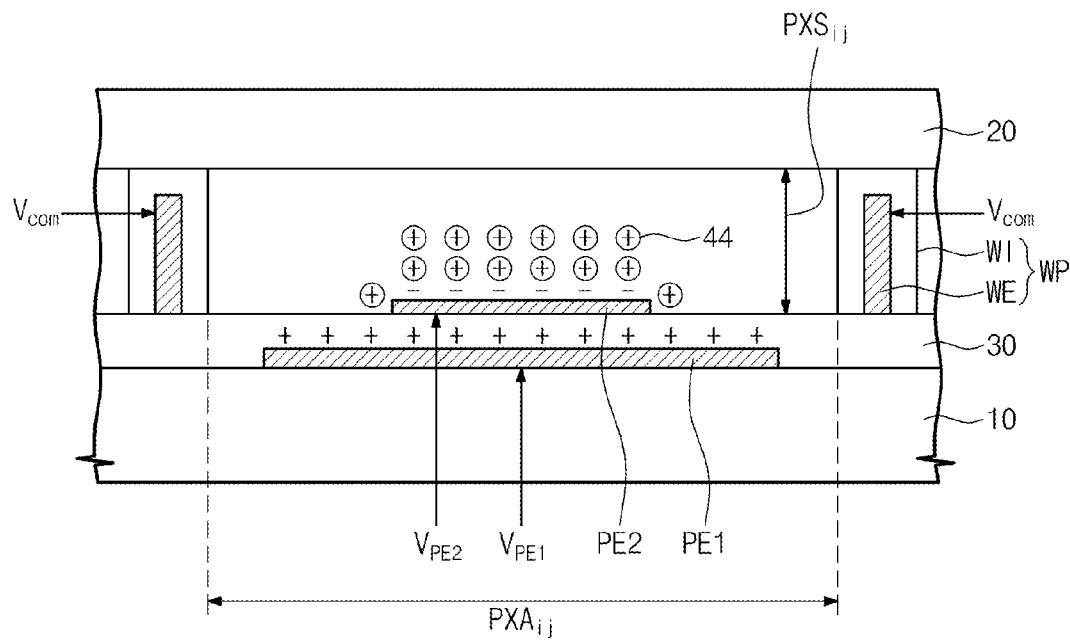

As shown in FIG. 4C, when the first pixel voltage VPE1 is higher than the common voltage VCOM and the second pixel voltage VPE2 is lower than the common voltage VCOM, the pixel PXij displays the third gray scale G3 shown in FIG. 5.

Figure 4D:
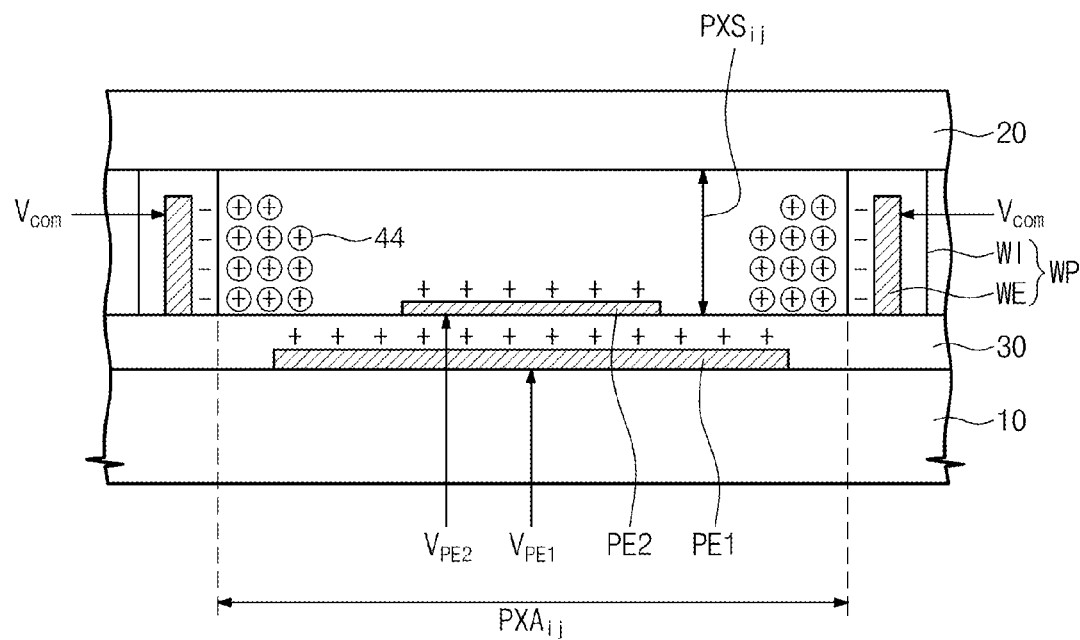

As shown in FIG. 4D, when the first pixel voltage VPE1 and the second pixel voltage VPE2 are higher than the common voltage VCOM, the pixel PXij displays the highest gray scale among the gray scales. As shown in FIG. 5, the pixel PXij displays the fourth gray scale G4.

In this case, in order to display the fourth gray scale G4 that is almost completely white, the second pixel voltage VPE2 is made higher than the first pixel voltage VPE1.

Figure 6A:
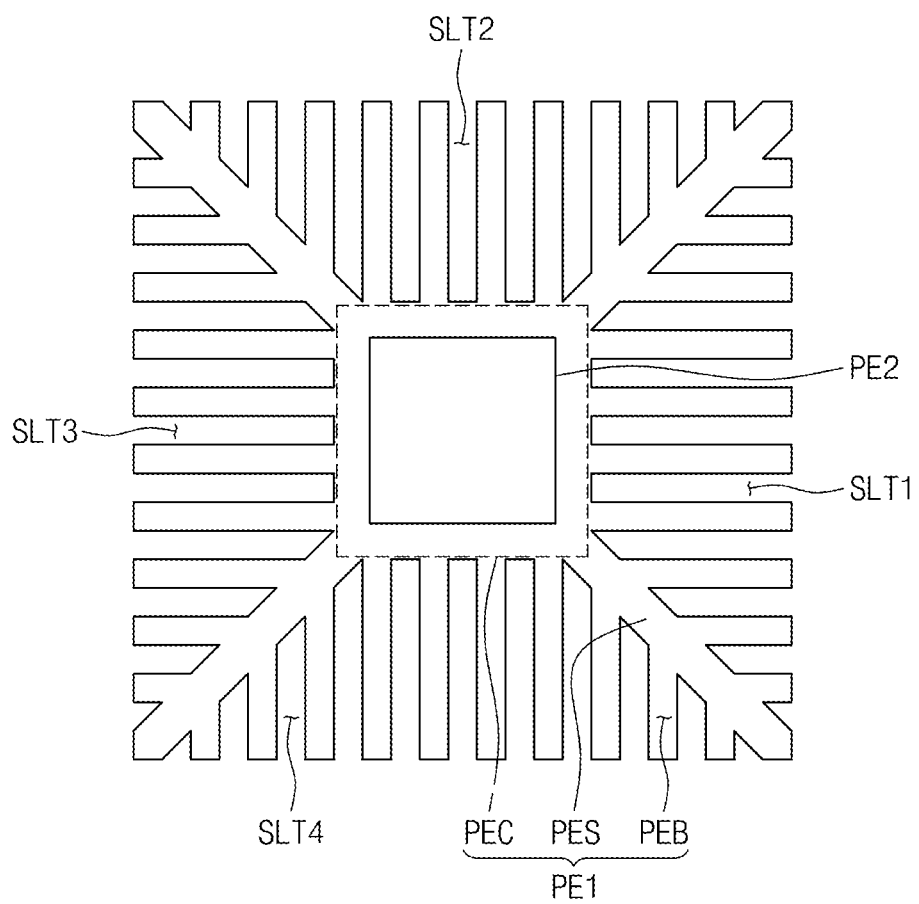
FIGS. 6A and 6B are plan views showing a pixel electrode according to another exemplary embodiment of the present invention.
Figure 6B:
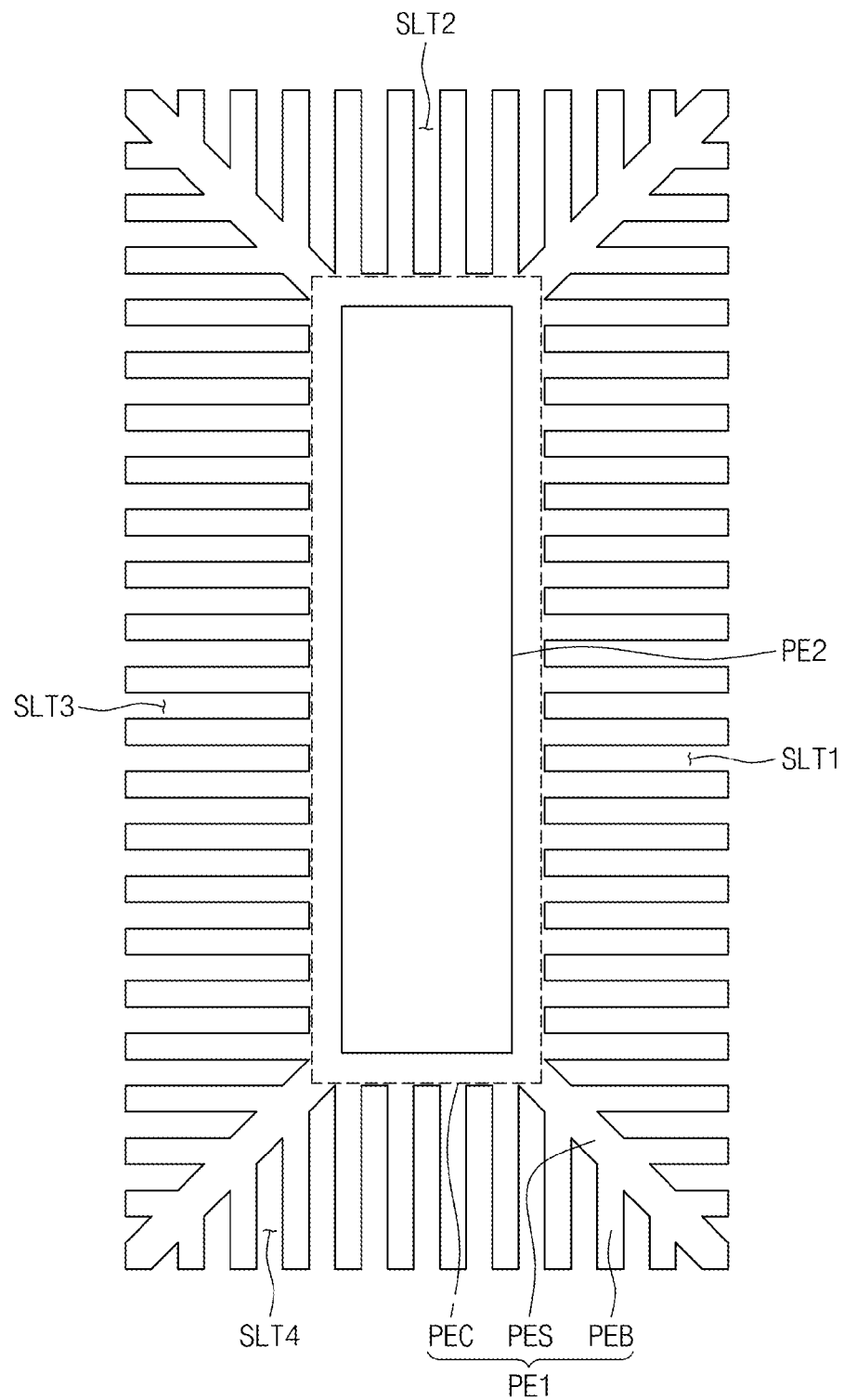

FIGS. 6A and 6B are plan views showing a pixel electrode according to another exemplary embodiment of the present invention.

Referring to FIGS. 6A and 6B, a first pixel electrode PE1 includes a plurality of slits SLT1 to SLT4 formed by partially removing the first pixel electrode PE1. The slits SLT1 to SLT4 may be divided into four groups according to the direction in which they extend from the center portion of the first pixel electrode PE1.

As described with reference to FIGS. 4A to 4D, the gray scales displayed in the pixel PXij depend on the positions of the electrophoretic particles 44. As shown in FIG. 4D, when the electrophoretic particles 44 are disposed adjacent to the barrier wall WP, the response speed of the electrophoretic particles 44 is slow even though the direction of the electric field is changed since the intensity of the electric field between the barrier electrode WE and edges of the first pixel electrode PE1. When the first pixel electrode PE1 includes the slits SLT1 to SLT4, the response speed of the electrophoretic particles 44 becomes relatively fast since the intensity of the electric field generated between the barrier electrode WE and the edges of the first pixel electrode PE1 is relatively weak.

In detail, the first pixel electrode PE1 includes a center portion PEC, a plurality of trunk portions PES protruding from the center portion PEC, and a plurality of branch portions PEB protruding from the branch portions PES. The branch portions PEB are alternately disposed with the slits SLT1 to SLT4.

The second pixel electrode PE2 overlaps with the center portion PEC of the first pixel electrode PE1 and has an area smaller than that of the center portion PEC of the first pixel electrode PE1.

Figure 7A:
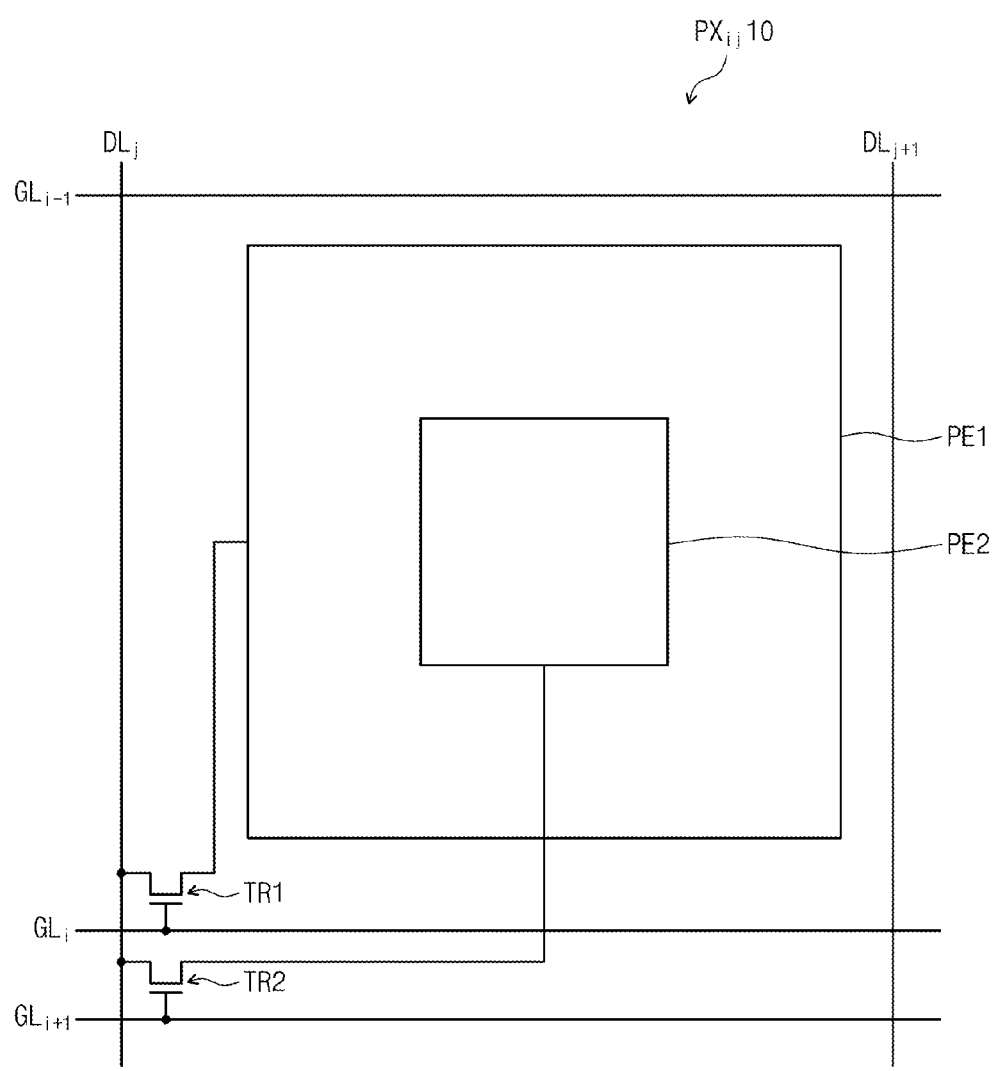
FIGS. 7A and 7B are views showing pixels according to another exemplary embodiment of the present invention.
Figure 7B:
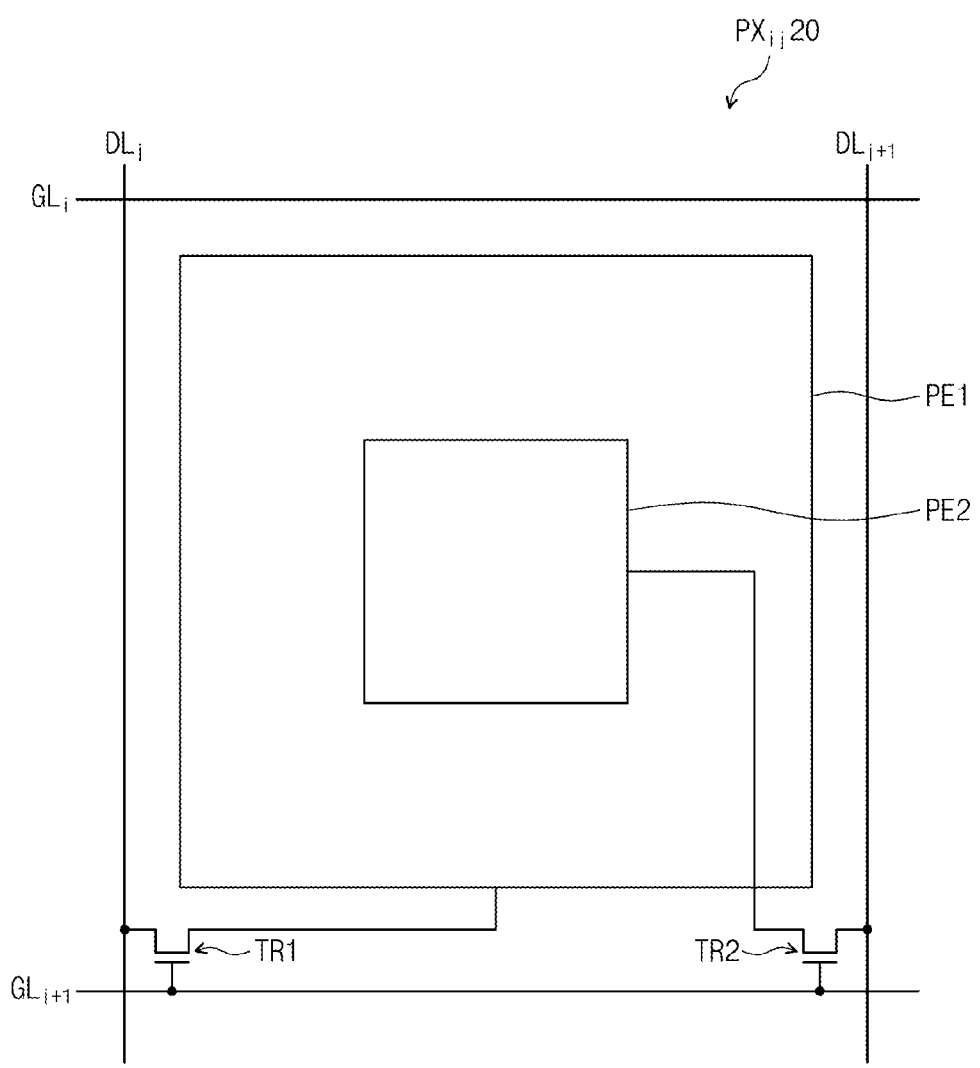

FIGS. 7A and 7B are views showing pixels PXij10 and PXij20 according to another exemplary embodiment of the present invention.

Referring to FIG. 7A, an i-th gate line GLi and an (i+1)th gate line GLi+1 are disposed at the same side of the first pixel electrode PE1 when viewed in plan view.

Referring to FIG. 7B, the first thin film transistor TR1 and the second thin film transistor TR2 are connected to the same gate line and connected to different data lines from each other. In this case, the first and second thin film transistors TR1 and TR2 are substantially simultaneously turned on.

The first thin film transistor TR1 is connected to the (i+1)th gate line GLi+1 and the j-th data line DLj, and the second thin film transistor TR2 is connected to the (i+1)th gate line GLi+1 and the (j+1)th data line DLj+1.

Figure 8A:
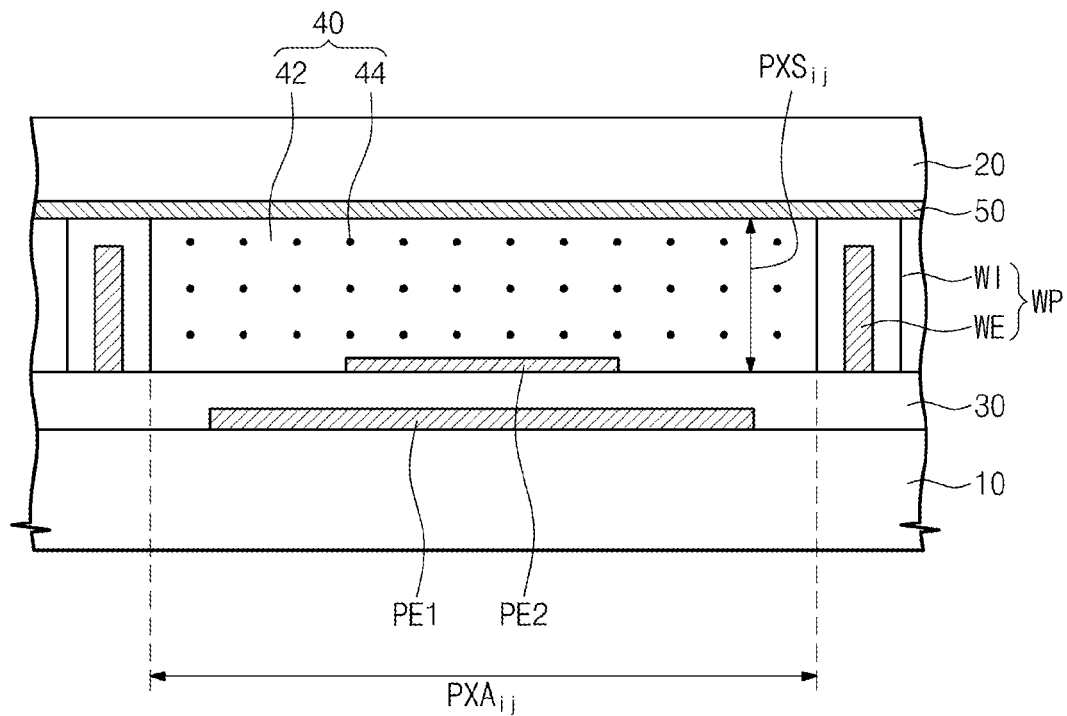
FIGS. 8A and 8B are cross-sectional views showing a pixel space according to another exemplary embodiment of the present invention.
Figure 8B:
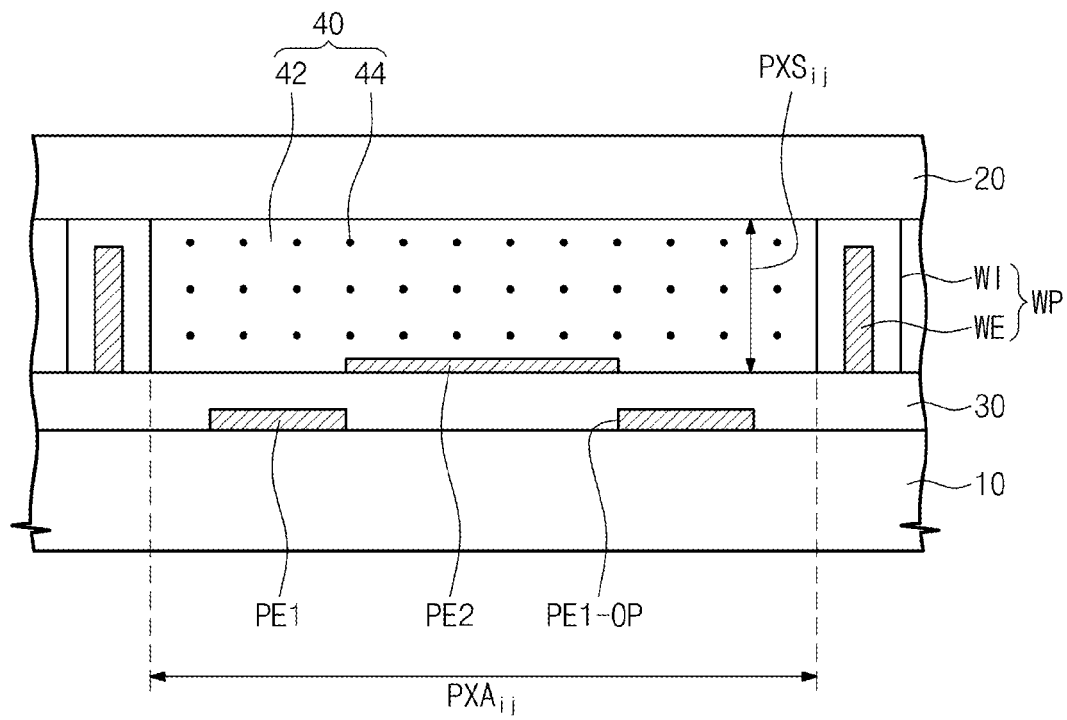

FIGS. 8A and 8B are cross-sectional views showing a pixel space according to another exemplary embodiment of the present invention. In FIGS. 8A and 8B, the same reference numerals denote the same elements in FIG. 2B, and thus detailed descriptions of the same elements will be omitted.

Referring to FIG. 8A, the display panel DP further includes a repelling electrode 50 disposed on the second substrate 20. The repelling electrode 50 prevents the electrophoretic particles 44 from getting too close to the second substrate 20. The repelling electrode 50 is applied with a voltage having the same polarity as the polarity of the electrophoretic particles 44. Thus, a repelling force acts between the repelling electrode 50 and the electrophoretic particles 44.

As described with reference to FIGS. 4A and 4B, although the direction of the electric field generated between the barrier electrode WE and the first pixel electrode PE1 and between the barrier electrode WE and the second pixel electrode PE2 is changed, the direction of the electric field on a surface of the second substrate 20 is not changed substantially. Accordingly, some of the electrophoretic particles 44 may be disposed adjacent to the surface of the second substrate 20 due to the friction between the second substrate 20 and the electrophoretic particles 44 regardless of the direction of the electric field.

However, since the repelling electrode 50 forms the electric field in cooperation with the barrier electrode WE, the first pixel electrode PE1, and the second pixel electrode PE2, the repelling electrode 50 exerts influences on the positions of the electrophoretic particles 44.

The repelling force generated between the repelling electrode 50 and the electrophoretic particles 44 pushes out the electrophoretic particles from the second substrate 20. As a result, the electrophoretic particles 44 approach to the first substrate 10, and thus the positions of the electrophoretic particles 44 are sensitive to the direction of the electric field.

As shown in FIG. 8B, the first pixel electrode PE1 may include an opening portion PE1-OP that completely overlaps the second pixel electrode PE2 in plan view.

FIGS. 9A and 9B are cross-sectional views showing a pixel according to another exemplary embodiment of the present invention. In FIGS. 9A and 9B, the same reference numerals denote the same elements in FIGS. 3B and 3C, and thus detailed descriptions of the same elements will be omitted.

Referring to FIGS. 9A and 9B, a pixel PXij30 further includes a storage electrode STE disposed under the first pixel electrode PE1 and insulating from the first pixel electrode PE1 while overlapping with the first pixel electrode PE1.

In detail, the first electrode GE1, the second electrode GE2, and the storage electrode STE are disposed on the first substrate 10. A first insulating layer 320 is disposed on the first substrate 10 to cover the first gate electrode GE1, the second gate electrode GE2, and the storage electrode STE.

The first pixel electrode PE1 is disposed on the first insulating layer 320. A second insulating layer 340 is disposed on the first insulating layer 320 to cover the first pixel electrode PE1. A third insulating layer 360 is disposed on the second insulating layer 340. According to embodiments, the third insulating layer 360 may be omitted.

A first contact hole TH10 and a third contact hole TH30 penetrate through the third insulating layer 360 and a second contact hole TH20 penetrates through the second insulating layer 340 and the third insulating layer 360.

The storage electrode STE, the first pixel electrode PE1, and the first insulating layer 320 disposed between the storage electrode STE and the first pixel electrode PE1 form a storage capacitor. Although the first thin film transistor TR1 is turned off, an electric potential of the first pixel electrode PE1 is maintained at the electric potential before turning off the first thin film transistor TR1 during a predetermined time period by the storage capacitor.

Figure 10A:
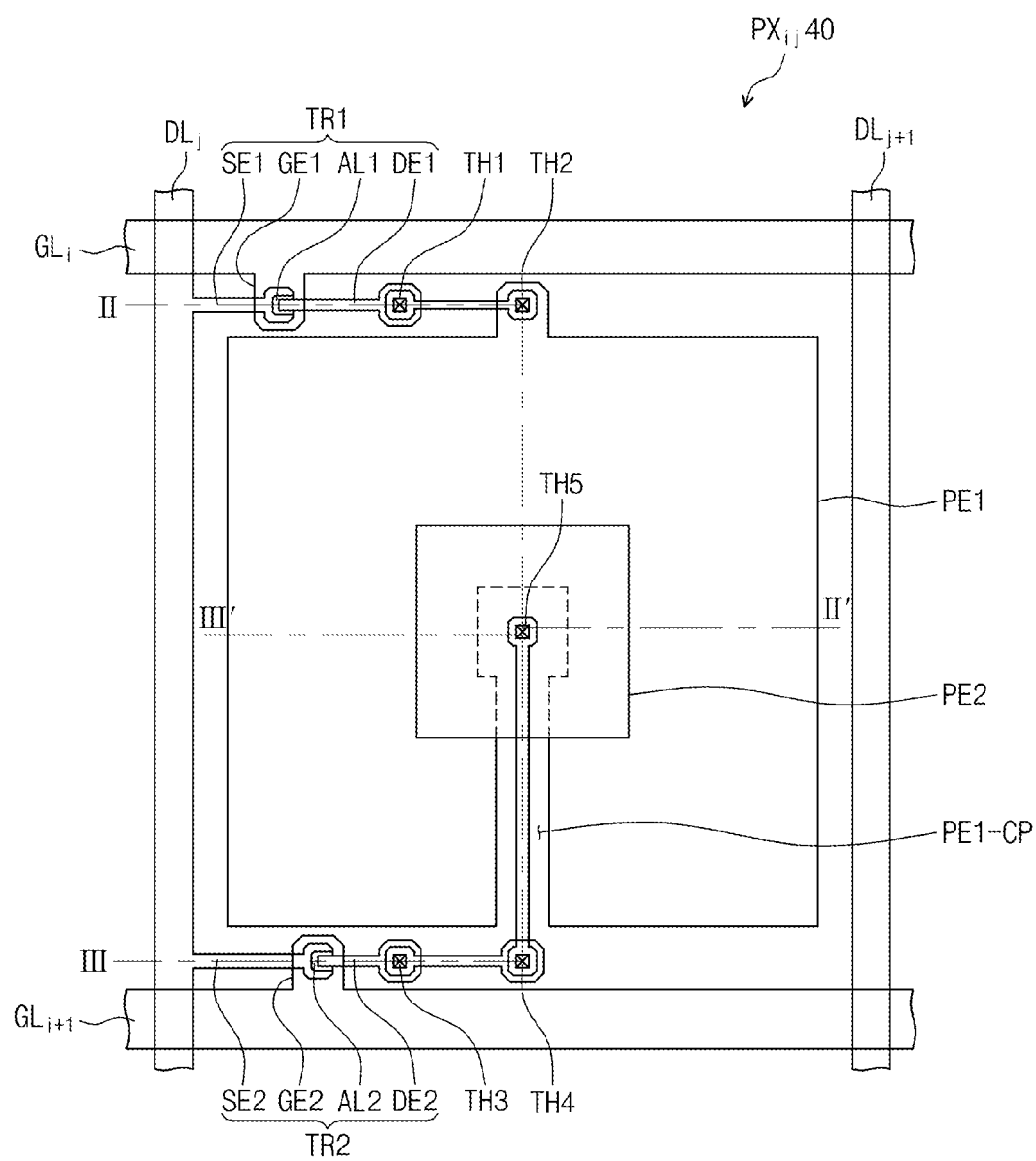
FIG. 10A is a plan view showing a pixel according to another exemplary embodiment of the present invention.
Figure 10B:
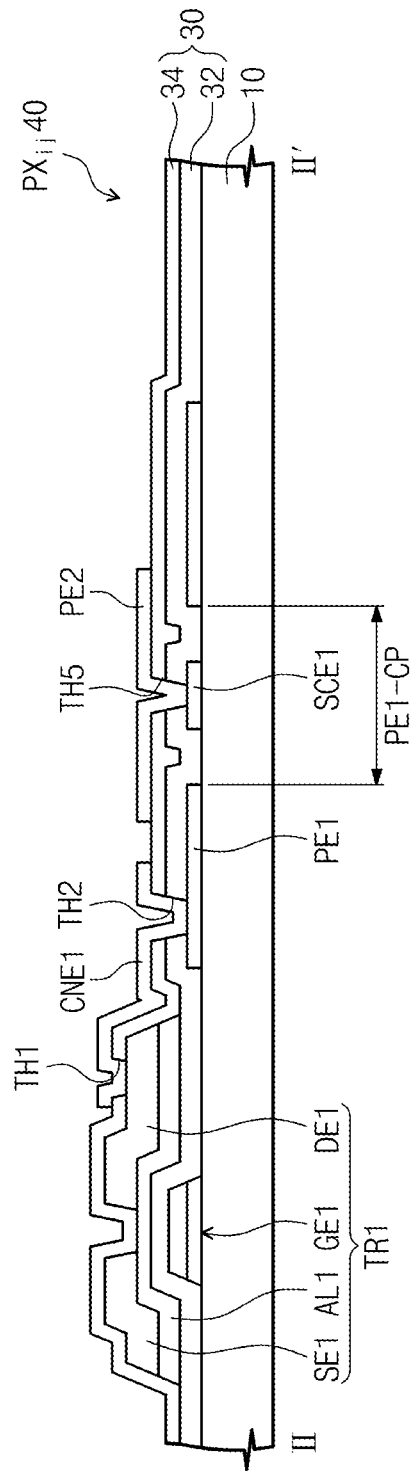
FIG. 10B is a cross-sectional view taken along a line IV-IV' shown in FIG. 10A.

FIG. 10A is a plan view showing a pixel according to another exemplary embodiment of the present invention, FIG. 10B is a cross-sectional view taken along a line IV-IV' shown in FIG. 10A, and FIG. 10C is a cross-sectional view taken along a line V-V' shown in FIG. 10A. In FIGS. 10A to 10C, the same reference numerals denote the same elements in FIGS. 3A to 3C, and thus detailed descriptions of the same elements will be omitted.

Referring to FIGS. 10A to 10C, the pixel electrode PE1 of a pixel PXij40 includes a cut away portion PE1-CP formed by partially removing the first pixel electrode PE1. The cut-away portion PE1-CP may have a shape extended to the center portion of the first pixel electrode PE1 from one side of the first pixel electrode PE1. The second pixel electrode PE2 is disposed on the center portion of the first pixel electrode PE1 to overlap with at least a portion of the cut-away portion PE1-CP.

The first pixel electrode PE1 provided with the cut-away portion PE1-CP is disposed on the first substrate 10. The first insulating layer 32 is disposed on the first substrate 10 and the second insulating layer 34 is disposed on the first insulating layer 32 to cover the first thin film transistor TR1 and the second thin film transistor TR2. The second pixel electrode PE2 is disposed on the second insulating layer 34.

As shown in FIG. 10B, a first connection electrode CNE1 disposed on the second insulating layer 34 connects the first drain electrode DE1 and the first pixel electrode PE1. The first connection electrode CNE1 connects the first drain electrode DE1 and the first pixel electrode PE1 through a first contact hole TH1 formed through the second insulating layer 34 and a second contact hole TH2 formed through the first insulating layer 32 and the second insulating layer 34.

As shown in FIG. 10C, the second pixel electrode PE2 and the second drain electrode DE2 are electrically connected to each other through a second connection electrode CNE2. The second connection electrode CNE2 is partially disposed in the cut-away portion PE1-CP.

The second connection electrode CNE2 includes a first sub-electrode SCE1 and a second sub-electrode SCE2. The first sub-electrode SCE1 is disposed to correspond to the cut-away portion PE1-OP of the first pixel electrode PE1. The first sub-electrode SCE1 has a shape corresponding to that of the cut-away portion PE1-CP, but not electrically connected to the first pixel electrode PE1.

The second sub-electrode CNE2 is disposed on the second insulating layer 34. The second sub-electrode SCE2 connects the second drain electrode DE2 and a first end portion of the first sub-electrode SCE1 through a third contact hole TH3 formed through the second insulating layer 34 and a fourth contact hole TH4 formed through the first insulating layer 32 and the second insulating layer 34. A second end portion of the first sub-electrode SCE1 is connected to the second pixel electrode PE2 through a fifth contact hole TH5 formed through the first insulating layer 32 and the second insulating layer 34.

Figure 11:
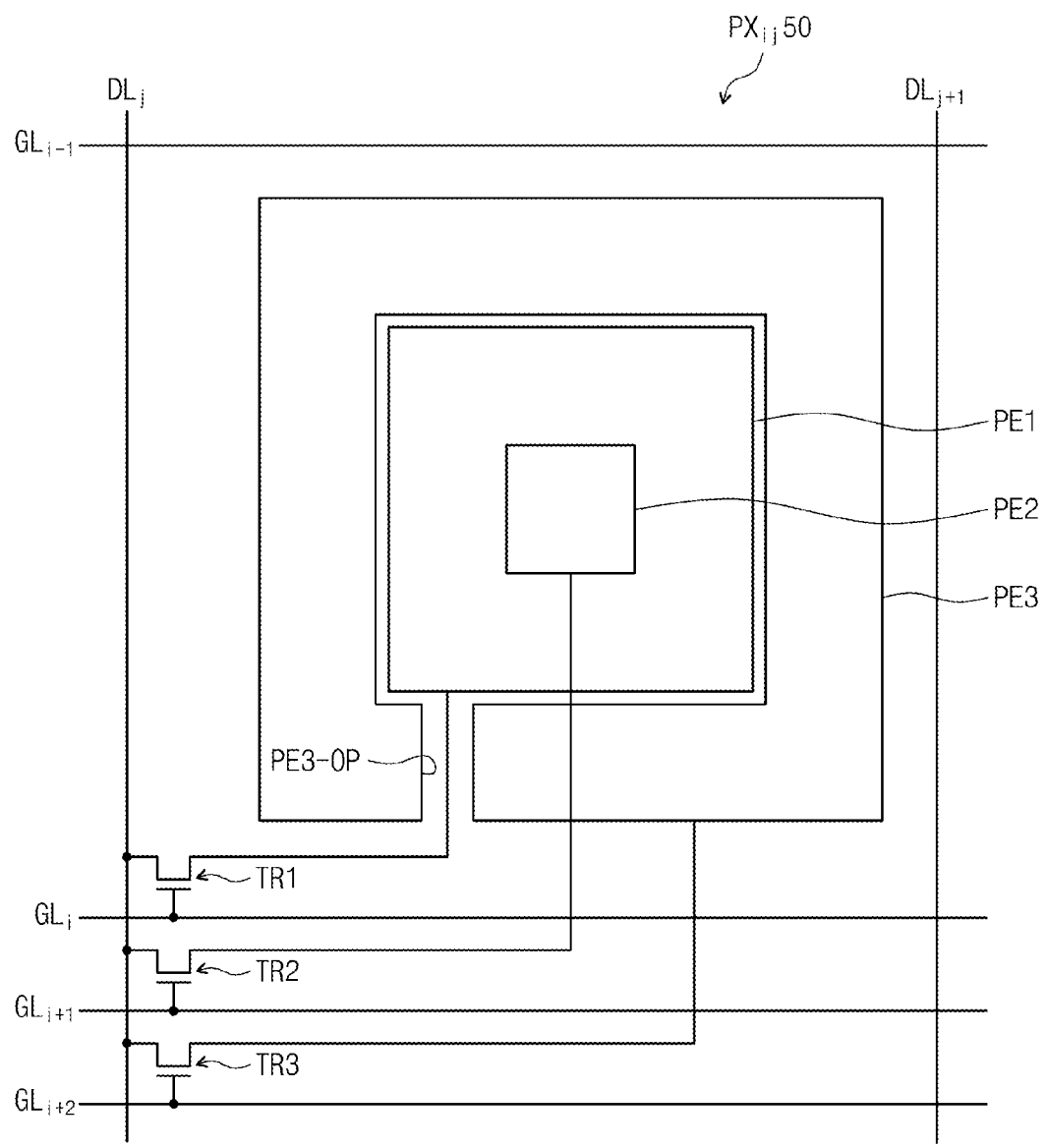
FIG. 11 is a plan view showing a pixel according to another exemplary embodiment of the present invention.
Figure 12:
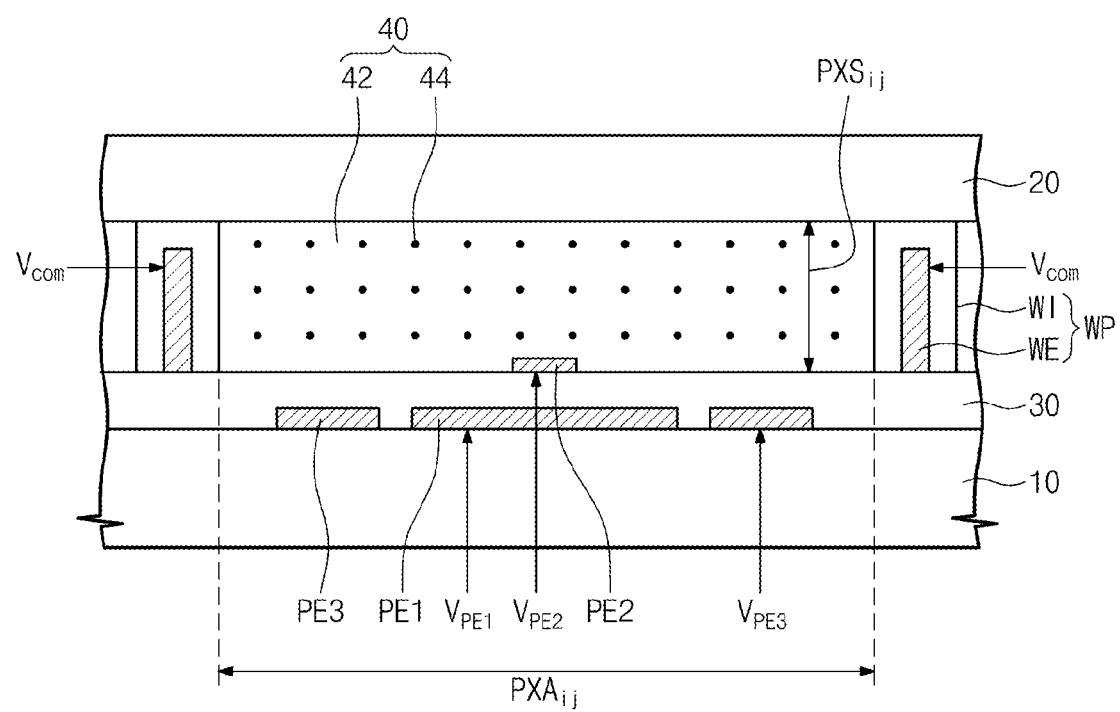
FIG. 12 is a cross-sectional view showing a pixel space corresponding to the pixel shown in FIG. 11.

FIG. 11 is a plan view showing a pixel according to another exemplary embodiment of the present invention, FIG. 12 is a cross-sectional view showing a pixel space corresponding to the pixel shown in FIG. 11, and FIG. 13 is a view showing gray scales displayed in the pixel shown in FIG. 11. In FIGS. 11, 12, and 13, the same reference numerals denote the same elements in FIGS. 1 to 5, and thus detailed descriptions of the same elements will be omitted.

A pixel PXij50 according to the present exemplary embodiment further includes a third pixel electrode PE3 and a third thin film transistor TR3 that applies a third pixel voltage VPE3 to the third pixel electrode PE3.

Referring to FIG. 11, the third thin film transistor TR3 is connected to an (i+2)th gate line GLi+2 of the gate lines GL1 to GLn, the j-th data line DLj, and the third pixel electrode PE3. The third thin film transistor TR3 outputs the data voltage applied to the j-th data line DLj to the third pixel electrode PE3 in response to the gate signal applied to the (i+2)th gate line GLi+2. The data voltage applied to the third pixel electrode PE3 is referred to as a third pixel voltage.

In plan view, the i-th gate line GLi, the (i+1)th gate line GLi+1, and the (i+2)th gate line GLi+2 may be disposed at the lower portion of the pixel PXij50.

As shown in FIGS. 11 and 12, the third pixel electrode PE3 is disposed to be spaced apart from the first pixel electrode PE1. The third pixel electrode PE3 partially surrounds the first pixel electrode PE1 in a plan view. The third pixel electrode PE3 has sides corresponding to at least three sides of the first pixel electrode PE1. The third pixel electrode PE3 provides different domains from those of the first pixel electrode PE1 and the second pixel electrode PE2.

The third pixel electrode PE3 is disposed on the same layer as the first pixel electrode PE1. For example, the third pixel electrode PE3 and the first pixel electrode PE1 may be directly formed on the surface of the first substrate 10 or directly formed on one of the insulating layers disposed on the first substrate 10.

The third pixel electrode PE3 may be provided with a cut-away portion PE3-OP. The first thin film transistor TR1 and the first pixel electrode PE1 are electrically connected to each other through the cut-away portion PE3-OP of the third pixel electrode PE3. At least a portion of the first pixel electrode PE1 may be disposed in the cut-away portion PE3-OP. The first pixel electrode PE1 includes an electrode portion and a connection portion branched from the electrode portion as the second pixel electrode PE3 described with reference to FIG. 3A. The connection portion of the first pixel electrode PE1 may be disposed in the cut-away portion PE3-OP of the third pixel electrode PE3.

The pixel PXij50 displays plural gray scales. As shown in FIG. 13, the pixel PXij50 may display eight gray scales G1 to G8.

The first gray scale G1 represents black, the eighth gray scale G8 represents white, and the second to seventh grays scales G2 to G7 represent different gray scale levels from each other.

When the first pixel voltage VPE1, the second pixel voltage VPE2, and the third pixel voltage VPE3 are lower than the common voltage VCOM, the pixel PXij50 displays the lowest gray scale among the gray scales. That is, the image displayed in the pixel PXij50 has the first grays scale G1.

In order to allow the first gray scale G1 to display the almost completely black gray scale, the second pixel voltage VPE2 is made to be lower than the first pixel voltage VPE1 and the third pixel voltage VPE3.

In the case that any one of the first pixel voltage VPE1, the second pixel voltage VPE2, and the third pixel voltage VPE3 has a polarity different form the others, the image displayed in the pixel PXij50 has the intermediate gray scales G2 to G7.

When the first pixel voltage VPE1, the second pixel voltage VPE2, and the third pixel voltage VPE3 are higher than the common voltage VCOM, the pixel PXij50 displays the highest gray scale among the gray scales. That is, the image displayed in the pixel PXij50 has the eighth grays scale G8.

In order to allow the eighth gray scale G8 to display the almost completely white color, the second pixel voltage VPE2 is required to be higher than the first pixel voltage VPE1 and the third pixel voltage VPE3.

As described above, when the pixel PXij50 further includes the third pixel electrode PE3 and the third thin film transistor TR3, the number of the gray scales represented by the pixel PXij50 increases.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An electrophoretic display device comprising:
a first substrate;
a second substrate that faces the first substrate;
a barrier electrode disposed between the first substrate and the second substrate to define a pixel, the barrier electrode receiving a common voltage; and
an electrophoretic material disposed in the pixel, the electrophoretic material including a dielectric solvent and a plurality of electrophoretic particles distributed in the dielectric solvent, the pixel comprising:
a first pixel electrode;
a first thin film transistor that applies a first pixel voltage to the first pixel electrode;
a second pixel electrode disposed on the first pixel electrode and insulated from the first pixel electrode; and
a second thin film transistor that applies a second pixel voltage to the second pixel electrode,
wherein the barrier electrode is spaced from the second pixel electrode in a plan view of the electrophoretic display device.

2. The electrophoretic display device of claim 1, wherein positions of the electrophoretic particles are controlled by an electric field generated between the barrier electrode and the first pixel electrode and between the barrier electrode and the second pixel electrode, and the pixel displays a plurality of gray scales corresponding to the positions of the electrophoretic particles.

3. The electrophoretic display device of claim 2, wherein the electrophoretic particles have a positive polarity, and the pixel displays a lowest gray scale among the gray scales when the first pixel voltage and the second pixel voltage are lower than the common voltage.

4. The electrophoretic display device of claim 3, wherein the second pixel voltage is lower than the first pixel voltage.

5. The electrophoretic display device of claim 2, wherein the electrophoretic particles have a positive polarity, and the pixel displays a highest gray scale among the gray scale when the first pixel voltage and the second pixel voltage are higher than the common voltage.

6. The electrophoretic display device of claim 5, wherein the second pixel voltage is higher than the first pixel voltage.

7. The electrophoretic display device of claim 2, wherein the pixel displays gray scales between the lowest gray scale and the highest gray scale among the grays scales when the first pixel voltage and the second pixel voltage have different polarities from each other with respect to the common voltage.

8. The electrophoretic display device of claim 2, wherein the electrophoretic particles have a negative polarity, and the pixel displays a lowest gray scale among the gray scale when the first pixel voltage and the second pixel voltage are higher than the common voltage.

9. The electrophoretic display device of claim 1, wherein a center portion of the second pixel electrode overlaps a center portion of the first pixel electrode, and wherein the second pixel electrode is smaller than the first pixel electrode.

10. The electrophoretic display device of claim 9, wherein the first pixel electrode comprises slits that surround the center portion of the first pixel electrode.

11. The electrophoretic display device of claim 10, wherein the first pixel electrode comprises trunk portions that protrude from the center portion of the first pixel electrode and comprises branch portions that protrude from the trunk portions, and wherein the branch portions are alternately arranged with the slits.

12. The electrophoretic display device of claim 1, further comprising a repelling electrode disposed on the second substrate to push out the electrophoretic particles from the second substrate.

13. The electrophoretic display device of claim 12, wherein the repelling electrode receives a voltage having a same polarity as the electrophoretic particles.

14. The electrophoretic display device of claim 1, wherein the first pixel electrode comprises an opening portion corresponding to the second pixel electrode.

15. The electrophoretic display device of claim 1, wherein the pixel further comprises a storage electrode disposed at a lower portion of the first pixel electrode and insulated from the first pixel electrode while being overlapped with the first pixel electrode.

16. The electrophoretic display device of claim 1, wherein the first pixel electrode comprises a cut-away portion, and the second pixel electrode and the second thin film transistor are electrically connected to each other by a connection electrode of which at least a portion is disposed in the cut-away portion.

17. The electrophoretic display device of claim 16, wherein the cut-away portion extends to a center portion of the first pixel electrode from a side of the first pixel electrode, and the second pixel electrode is disposed on the center portion of the first pixel electrode.

18. The electrophoretic display device of claim 1, wherein the pixel further comprises:
a third pixel electrode disposed to be spaced apart from the first pixel electrode; and
a third thin film transistor that applies a third pixel voltage to the third pixel electrode.

19. The electrophoretic display device of claim 18, wherein the third pixel electrode is disposed on a same layer as the first pixel electrode.

20. The electrophoretic display device of claim 19, wherein the third pixel electrode at least partially surrounds the first pixel electrode.

* * * * *